(12) United States Patent
Kaid et al.

(10) Patent No.: US 8,752,163 B2
(45) Date of Patent: Jun. 10, 2014

(54) METHOD FOR AUTHORIZING A PROGRAM SEQUENCE

(75) Inventors: Almar Kaid, Hamburg (DE); Bernd Peeters, Timmendorfer Strand (DE); Thomas Rogowski, Hamburg (DE)

(73) Assignee: Steinberg Media Technologies GmbH, Hamburg (DE)

( * ) Notice: Subject to any disclaimer, the term of this patent is extended or adjusted under 35 U.S.C. 154(b) by 140 days.

(21) Appl. No.: 13/446,060

(22) Filed: Apr. 13, 2012

(65) Prior Publication Data

US 2013/0232567 A1    Sep. 5, 2013

(30) Foreign Application Priority Data

Mar. 5, 2012 (EP) ..................................... 12158009

(51) Int. Cl.
*G06F 12/14* (2006.01)
(52) U.S. Cl.
USPC .................................. 726/17; 726/16; 726/21
(58) Field of Classification Search
USPC .......................... 726/16–17, 21; 713/189–190
See application file for complete search history.

(56) References Cited

U.S. PATENT DOCUMENTS

| | | | | |
|---|---|---|---|---|
| 6,038,378 | A * | 3/2000 | Kita et al. .................. | 714/38.11 |
| 6,643,775 | B1 | 11/2003 | Granger et al. | |
| 7,111,285 | B2 * | 9/2006 | Smith et al. .................... | 717/140 |
| 7,313,692 | B2 * | 12/2007 | Weeks et al. .................. | 713/156 |
| 7,395,550 | B2 * | 7/2008 | Weeks et al. .................... | 726/10 |
| 7,904,956 | B2 * | 3/2011 | Golan et al. .................... | 726/22 |
| 8,214,902 | B2 * | 7/2012 | Khosravi et al. ................ | 726/24 |
| 8,381,242 | B2 * | 2/2013 | Berg et al. ........................ | 725/25 |
| 8,522,047 | B2 * | 8/2013 | Eker et al. ..................... | 713/190 |
| 8,572,574 | B2 * | 10/2013 | Ghosh et al. .................. | 717/126 |
| 2003/0023413 | A1 * | 1/2003 | Srinivasa .......................... | 703/2 |
| 2007/0014394 | A1 * | 1/2007 | Harder et al. ................... | 380/28 |
| 2008/0189094 | A1 * | 8/2008 | Adir et al. ....................... | 703/14 |

OTHER PUBLICATIONS

Christian Colberg, et al, "A Taxonomy of Obfuscating Transformations"; Technical Report No. 148, Department of Computer Science, University of Auckland, published Jul. 1, 1997; Section 6.3.3, p. 15, Section 7 pp. 17-21; Auckland, NZ.
Thomas Sander, et al, "Towards mobile cryptography"; Security and Privacy, 1998. May 3, 1998; pp. 215-224; Proceedings 1998 IEEE Symposium in Oakland, CA, USA.
Edmund M. Clarke, et al, "Chapter 2: Modeling Systems", "Model Checking", Jan. 1, 1999, pp. 13-26; The MIT Press, Cambridge MA, USA.
Diego Bendersky, et al; "Advanced Software Protection Now", Jun. 11, 2010; Section 3 pp. 6-10.
Hoi Chang, et al, "Protecting Software Code by Guards", Lecture Notes in Computer Science/Computational Science, Jun. 10, 2002; pp. 160-175.

* cited by examiner

*Primary Examiner* — Linglan Edwards
(74) *Attorney, Agent, or Firm* — Hunton & Williams LLP

(57) ABSTRACT

A method for authorizing a program sequence provides, despite centralization and the associated high latency and optionally faulty communication, an undisturbed program sequence accompanied by protection of base functionalities. Data of the program sequence may be maintained in various provided states, and at least one instruction of the program sequence which accesses the data is maintained in different, functionally equivalent implementations. The set of the state indices of the provided states and the multiset form a directed acyclic (multi)graph, wherein the provided states form the nodes, and the implementations of the instruction form the edges and/or multiple edges, of the graph.

15 Claims, 3 Drawing Sheets

METHOD FOR AUTHORIZING A PROGRAM SEQUENCE

FIELD OF THE INVENTION

The present invention relates to a method for authorizing a program sequence, a corresponding computer program, a data carrier having such a computer program, and an appropriately configured data processing unit.

BACKGROUND OF THE INVENTION

Carrying out software authorization is basically known from the prior art. This may be performed, for example, by inputting appropriate license keys, or in a recurring manner via challenge response protocols. At a location in the program code, a value which has been encrypted using a cryptographic method is transmitted to an external module, the internal computing sequences of which the user of the application does not have access; the user is able to observe only the input and output data. The external module, which has the corresponding cryptographic algorithms, decrypts the value, performs certain operations on the plaintext, and returns the encrypted result to the actual program code. When the actual program code receives the correct result, the further instructions in the program code are correctly executed. If the result is incorrect, i.e., it has been manipulated from the outside, or no result at all is returned, for example, the software fails to run properly or is blocked. Such external modules may be formed by USB dongles or smart cards, for example.

In the method described above, the communication with the external module results in latency in the program sequence. This makes it impossible to integrate the authorization process not only into performance-critical program functionalities, but also into functionalities which are used frequently or with a certain continuity by the user of the application, since interfering delays in the program flow or in operating the application would otherwise occur. This is particularly true when the external module is not directly connected, but instead is linked to the program or the corresponding data processing unit via possibly faulty communication means. Thus, a compromise between security and performance is usually made when challenge response protocols are used, even if integration of the authorization process into essential base functionalities would improve the quality of protection.

In addition, in this type of method it is usually not possible to securely control the sequence or the frequency of the authorization, or to import or change statistical parameters which control the probability or frequency of carrying out the authorization processes. If such a change to the actual program or the program portion responsible for the authorization is made possible, this often provides an easy opportunity for manipulation from the outside, and thus represents a significant security risk for protection of the program sequence.

Furthermore, the use of an external module represents a large outlay in materials, costs, and administrative effort. Centralization of external modules, for example via a server on the Internet, is therefore desirable.

SUMMARY OF THE INVENTION

The object of the present invention, therefore, is to extend the known authorization methods in such a way that, despite centralization and the associated high latency and optionally faulty communication, an undisturbed program sequence is made possible, also with protection of base functionalities. A further aim is that the control of the initiation of the authorization process can be modeled in the development stage of the computer program product. However, control of the initiation of the authorization process from outside the method to be authorized, for example by the external module, is also made possible by the present invention.

This object is achieved by various embodiments of the invention that may include a method, a computer program product, a data carrier, and a data processing unit.

The object is achieved according to the invention in that the complex authorization processes are shifted, at least partially, to a point in time in which latency is not critical. The shifting of the authorizations as well as the option for using a central external module also allow further innovative licensing options. However, the invention is not limited to the licensing of software. Authorization of a program sequence may also take place within the scope of other processes, such as access controls, in which every access is not relevant to safety.

For this purpose, according to the invention a program sequence is provided which is to be protected from unauthorized use, and whose use must be authorized. The program sequence may represent any given function in a software product.

It is also conceivable to protect and/or authorize various instructions, functions, or processes using appropriate precautionary measures according to the invention.

According to the method, it is possible to maintain data of the program sequence in various provided states. These states are identified or identifiable by indices, for example. The data are advantageously long-term data, in particular concerning long-term variables of the program code, thus further increasing the security.

In addition, at least one instruction of the program sequence which accesses the data is maintained in different, functionally equivalent implementations, wherein the set of implementations is parameterized by a non-empty finite multiset over the Cartesian product of the set of the state indices of the provided states of the data with itself, and each implementation converts the data from an input state into an output state. The input state and the output state are components of the provided states.

According to the invention, the set of state indices of the provided states and the multiset of the implementation indices form a directed acyclic (multi)graph, the provided states forming the nodes, and the functionally equivalent implementations of the instruction forming the edges and/or multiple edges, of the graph. The basis, essential to the invention, for carrying out the method is provided by this implementation of the provided states and the implementations of the instruction, and the (multi)graph thus formed. Asynchronous authorization in particular is made possible.

For an input state, by definition one of the functionally equivalent implementations cannot be a sink in the graph. According to the invention, a sink in the graph represents a mandatory authorization state in which none of the implementations of the instruction of the program sequence can be executed without authorization. However, it is possible for an output state to be a mandatory authorization state. When the output state is not a mandatory authorization state, an output state of a first implementation is an input state of at least one further implementation.

Various authorization models may be implemented, depending on the selection of the provided states and implementations, i.e., the configuration of the graph or multigraph. The number of executions of the instruction prior to the first authorization, i.e., possibly unauthorized executions, may thus be advantageously defined. Such a predefinition is possible as a result of the configuration of the graph and the selection of the initial state of the data in the program sequence at the start of the program sequence (starting point in the graph). In this case an origin of the graph, for example, may be selected as the initial state. The number of unauthorized executions of the instruction in the program sequence is determined by the maximum over the length of the paths from the initial state to a mandatory authorization state in the graph.

In addition, at least one authorization program sequence path in which transfer data are transferred to an authorization component is present in the program sequence. The authorization program sequence path may be a component of the program sequence and/or at least partially segregated into an independent component. The authorization component may be comparable to the known external module, or may be contained therein, and may have a local or remote location. The authorization component returns at least one authorized information item, in particular only when predefined conditions are present. The method is characterized in that the authorized information is used for changing the state of the data into one of the provided states (the same or different states), or for changing the data themselves, in particular only when the data and/or the state of the data has/have not changed since the transfer data have been transferred. In particular, it is thus also possible to select a sink in the graph as the first state.

Conversion into different states may occur, depending on the design of the at least one authorization program sequence path and/or the authorization component. After an authorization, a different number of further executions of the instruction of the program sequence path in the form of the maintained implementations which require no authorization process may thus be possible. Thus, the authorization dynamics may also be changed as a result of the authorization component. In addition, the authorization program sequence path may be notified by the authorization component as to how it should attempt an authorization before reaching a mandatory authorization state.

Thus, for example, the multigraph may have various branches, and as the result of an authorization a change may be made from one branch of the graph to another, or a defined skip back to a branch may be carried out.

As the result of such an authorization, behavior may be achieved, for example, in which a predetermined number of executions of the instruction is possible without authorization, and only after reaching this number is an authorization necessary, which, for example, then once again allows a predetermined number of executions without additional authorization. In such a design, as well as in general, the authorization may also advantageously take place before reaching a mandatory authorization state. Thus, a continuous attempt may advantageously be made, in parallel with the normal program sequence, to acquire an authorization, and thus to lengthen the path on the graph until reaching the mandatory authorization state. In particular, however, this is successful only when no further implementations have been applied to the data in the meantime. Such a design is particularly advantageous when the connection to the authorization component is not, or is not always, undisturbed, or an authorization is associated with a comparatively high latency.

With regard to the authorization component, the user advantageously has only black box access (represented, for example, by a server on the Internet or a smart card which is locally linked to the computer system executing the program).

Numerous information items in various embodiments are conceivable as at least one authorized information item. For example, it is possible for the data in a provided state to be returned as authorized information or to contain same, also in obfuscated or encrypted form. In addition, information concerning the state or the content of the additional authorized information may be contained. Thus, for example, the data or changed data in a provided state as well as information concerning the state may be returned as authorized information. In addition, the transfer data may contain data concerning a state, or the state of the data.

For example, certain results of queries in a license database, times, and password entries, among others, are conceivable as predefined conditions.

It is also possible to provide multiple or different authorization program sequence paths. For example, the selection of the authorization program sequence path to be used may be based on the instantaneous state.

Numerous information items are suitable as transfer data. Thus, for example, the data may be transmitted in the instantaneous state. Different/additional information items are also conceivable as transfer data.

According to the invention, when for the instantaneous state at least one edge in the graph exists which leads away from the state toward another provided state, an implementation which corresponds to this edge is executed when the instruction in the program sequence is called up.

In addition, according to the invention the further use of the instruction of the program sequence in a mandatory authorization state which corresponds to a sink in the graph is possible only when an authorization program sequence path is called up, the authorized information is returned by the authorization component, and after execution of the authorization program sequence path the data are in one of the provided states, in particular in a state which does not represent a mandatory authorization state.

In principle, a distinction is made between two possible advantageous implementations. On the one hand, a use of the instruction of the program sequence to be authorized may be provided only in the program. If the data are then in a mandatory authorization state, the data must first be converted, by means of an authorization, into a provided state which does not represent a mandatory authorization state, and an appropriate implementation of the instruction to be authorized may then be executed. This implementation is particularly suitable when the method is to be used for asynchronous authorization.

On the other hand, it is possible to also maintain an instruction, whose functionality corresponds to the instruction to be authorized, in the authorization component, and to allow the corresponding instruction for the authorization component to be used in the authorization component. In this case, also starting from a mandatory authorization state, in the authorization component use may be made of the functionality of the instruction to be authorized without prior conversion into a provided state which does not represent a mandatory authorization state, using the corresponding instruction for the authorization component, within the scope of an authorization. As a result of the authorization, the corresponding instruction is then executed directly in the authorization component. The authorized information contains the result of the execution of the corresponding instruction. After the authorization, the data may then be present in changed form in a mandatory authorization state, in particular the same state as before the authorization, or another provided state. This implementation of the method is suitable when the program sequence contains processes for which a synchronous authorization is to be used.

By use of the method according to the invention, it is possible to execute the instruction of the program sequence via its implementations until a mandatory authorization state, i.e., a sink in the graph, is reached as a result of the executions of the functionally equivalent implementations of the instruction. Execution of the instruction of the program sequence in such a sink is not possible, since no appropriate implementation is provided, and a return to a provided state which is not a sink is not provided and/or is not possible without authorization.

Even though the method per se as the result of its process sequence already makes it more difficult to attempt external interference/manipulation for using the instruction without provided authorization, for security the data in the provided states and/or the implementations of the instruction are advantageously maintained, completely or partially, in obfuscated and/or encrypted form. In the case of encryption, for each of the provided states an independent cryptographic key which is suitable for the encryption algorithm used is advantageously employed for encrypting the data, thus greatly increasing the security. Thus, any provided state may represent a provided encryption state. In addition, the implementations may convert the data from one provided encryption state into another provided encryption state.

In general, it is noted that the implementation of encryption processes in software which is executed in an untrusted environment is frequently easy to manipulate, and is therefore often concealed in the program code, for example using methods of program code obfuscation or white box cryptography. Within the meaning of the present patent application, obfuscation or encryption may be selected in each case, depending on the requirements for security. In particular, obfuscation and encryption may be combined.

In one embodiment of the invention, it is particularly advantageous that the encryption algorithm used is a component of a cryptographic method, in particular Multi-Channel Finite Automata Code Transformation (MCFACT), the method allowing operations on arguments which are encrypted using various keys to be carried out without decrypting the arguments in question. The functionally equivalent implementations of the at least one instruction as well as the implementations of portions of the at least one authorization program sequence path use this cryptographic method in whole or in part.

This means that the data or the states of the data for using the function do not have to be decrypted, and therefore do not have to be present within the program sequence in decrypted or unobfuscated form. In particular, the functionally equivalent implementations of the instruction to be authorized may contain the re-encryption of the input state to the output state with regard to the particular cryptographic key, thus greatly increasing the security.

The instruction or the functionally equivalent implementations advantageously receive(s) at least one additional argument, so that it/they is/are able to carry out an operation on the data using the additional argument, and in particular for each execution. The instruction or the functionally equivalent implementations advantageously receive(s) the additional argument in an encrypted variant.

It is particularly advantageous that the instruction has read/write access to the data, and in particular has read/write access to the data for each execution. A state change alone would not meet this requirement. Each of the functionally equivalent implementations then writes the data in the output state. In addition, each maintained implementation is correctly executed only when applied to data in the corresponding input state of the implementation of the instruction. It is thus ensured that after being applied to the data, an implementation cannot be immediately re-applied to the data.

Each implementation, when applied to data in any other state than the associated input state, transfers the program sequence into an error state or an unsuitable state, which may be achieved using the mentioned cryptographic methods, for example. In particular, a direct change in the data and/or a direct change in at least one of the implementations or the states upon application of a changed implementation or upon application of an implementation to the changed data results in an error state, an unsuitable state, and/or an exception state of the data which is not a component of the provided states, and thus makes further execution of the instruction impossible since no appropriate implementation is available.

The transfer into an unsuitable state causes a result which goes beyond strictly preventing the execution of the instruction, and has further consequences. Thus, for example, the further program sequence may be disturbed, so that the program sequence no longer operates correctly on account of an inconsistent database, and/or the overall program is blocked, and/or at least one appropriate message or warning is initiated.

The authorized information returned from the authorization component is particularly advantageously a function of the transfer data, thus further increasing the security. The authorized information advantageously allows the authorization program sequence, starting from a provided state of the data, to convert the data into one of the provided states, in particular a state which does not represent a mandatory authorization state, but in particular allows this only when the state of the data and/or the data has/have not changed since the transfer data have been transferred to the authorization component and/or the authorization program sequence path. This type of information is preferably required within the authorized information to allow the authorization program sequence to make such a conversion. Therefore, the authorization program sequence and also the program sequence, apart from the application of the maintained implementations, cannot by themselves or without cooperation with the authorization component convert a state into another of the provided states, or in particular also change the data within a state. For this purpose, the authorization program sequence requires in particular appropriately authorized information or re-encryption by the authorization component.

As the result of such re-encryption within the authorization component, for example a conversion of the data from one state into another of the provided states may take place, thus lengthening, for example, the remaining path on the branch of the graph until reaching the mandatory authorization state. If the program sequence per se, and in particular also the authorization program sequence, do not have the necessary means or information to carry out such re-encryption, apart from the application of the maintained implementations, the security is further increased. The maximum over the length of the paths from the state after the conversion to a mandatory authorization state in the graph is advantageously equal to or greater than the maximum over the length of the path from the state before the conversion to a mandatory authorization state.

In addition, the authorized information, at least in some cases of the authorization, may contain a result of an application of an instruction whose functionality corresponds to the instruction of the program sequence. This provides the option of a secure synchronous authorization. If this is carried out in all cases of the authorization, synchronous authorization is present. A combination of synchronous and asynchronous authorization may be achieved by provision only in some cases.

In another embodiment of the invention, it is particularly advantageous that the transfer data are transferred to the authorization component in obfuscated and/or encrypted form. In the case of encryption of the data, the transfer data are encrypted in particular by an additional encryption algorithm that is different from the encryption algorithm used for encryption of the data. A further advantage is that the authorization component returns the authorized information in obfuscated and/or encrypted form, in particular using an additional encryption algorithm that is different from the encryption algorithm for the encryption of the states.

It is particularly advantageous that the carrying out of the method is divided into at least three components. The method is advantageously divided into an operating component, an authorization coordination component, and an authorization component. The data of the program sequence, the instructions of the program sequence, and the program sequence are advantageously a constituent of the operating component. The at least one authorization program sequence path advantageously carries out the transfer of the transfer data to the authorization component, and receives the authorized information returned from the authorization component. In addition, the authorization program sequence path is responsible for converting the data into one of the maintained states or changing the data in the maintained state, in particular using the authorized information. The authorization program sequence path is advantageously a constituent of the authorization coordination component.

However, the authorization coordination component and/or the authorization program sequence path or their respective functions may also be provided within the scope of the operating component or the program sequence, respectively.

As the result of such a division into three or more components, the actual function, the authorization task having direct cooperation with the actual function, and the authorization per se may be separated from one another in a modularized manner.

This allows corresponding encapsulation. The individual components may thus be designed in parallel, resulting in a particularly smooth implementation and a very advantageous way of dealing with latency of the authorization process.

Thus, the authorization coordination component and the operating component are advantageously designed in parallel, in particular as independent computer program components running in parallel, in particular as independent threads or as part of an independent computer program running in parallel. The authorization processes may thus be carried out essentially without influencing the operating components.

It is particularly advantageous that status information concerning the data of the program sequence, in particular concerning the instantaneous state of the data and/or the various compatible implementations, is maintained. As the result of maintaining such status information, information concerning the state or the available implementations starting from this state may be easily maintained. This may be meaningful, for example, when such information is transmitted to and returned from the authorization component. The particular key or the particular key number with which the data in the state may be decrypted or re-encrypted may be contained within this information. For this purpose, the key itself is advantageously neither transmitted, nor, apart from the authorization component, maintained in plaintext.

It is also advantageous that, according to other embodiments of the invention, the maintained implementations, at least partially, and/or at least one key for encrypting the data or the implementations, is/are selected in such a way that they may be determined, according to a rule, from at least one previously executed implementation or at least one previously used key and/or one or a portion of the provided states and/or further data that are relevant for the program sequence. In particular, the form of the rule and optionally the starting values are advantageously maintained, and on this basis the corresponding implementation or the corresponding key is generated in each case. This may be realized, for example, using white box cryptography methods. In such an implementation, it is not necessary to explicitly and completely maintain numerous implementations or keys. The implementations or keys in each case may be generated from the previous rule or on the basis of the maintained rule, thus reducing the size of the program.

According to a further embodiment of the invention, it is particularly advantageous that the authorization component is situated or carried out spatially separately from the carrying out of the steps which are not performed by the authorization component. In particular, the transfer data to be transmitted to the authorization component as well as the authorized information are transmitted via a data transmission network, in particular the Internet. Depending on the requirements for the method, a decentralized authorization may thus be made possible. Furthermore, the advantages of the method become particularly apparent, since in addition, transmission problems over the data transmission network may be buffered using the method according to the invention.

The method according to the invention may be implemented in new and in existing program codes, for example by providing, via a suitable transformation of the source code, the provided states of the data as well as the functionally equivalent implementations of the instruction. This transformation as well as the use of the instruction to be authorized may be carried out as in the following example:

For example, the content of a buffer variable T in the program may be used as data, and an instruction which adds data to the buffer is selected as the instruction F to be authorized. Thus, a read/write instruction T=F(T,Y) is present, where Y denotes the data to be added. As a possible realization of the implementations and/or provided states, cryptographic methods may be used which contain an encryption algorithm E and a functionality EVAL such that with regard to the instruction, the pseudo-homomorphic property $$E_{K3}(F(A,B))=\text{EVAL}_{K3}(F,E_{K1}(A),E_{K2}(B))$$

having cryptographic keys $K_1$, $K_2$, $K_3$ applies. "Pseudo-homomorphic" means that the cryptographic keys may also be different, and therefore only certain homomorphic encryption schemes, for example MCFACT, are suitable for the method. Furthermore, information concerning the cryptographic keys may be securely transmitted to the functionality EVAL, which defines the encryption state of the input and output arguments. The encryption process may be implemented, for example, using methods of white box cryptography or program code obfuscation which allow key information to be concealed. The functionality computes correctly only when the encryption states of the input and output parameters are compatible with the transferred key information.

Thus, a parameter n equal to or greater than one ($n \geq 1$) is initially specified which indicates the maximum number of times the instruction will be freely provided for unauthorized execution. For example, a set of different cryptographic keys $K_0$ through $K_n$ corresponding to the parameter is then generated for encrypting the data. In addition, for example a fixed key K is generated for encrypting the data to be added, with which the instruction to be authorized operates. Encryption of the data to be added is not absolutely necessary for carrying out the method, but it increases the security of the method by making it difficult for a potential attacker to deduce the plaintext of the data. The program source code is then transformed in such a way that the initialization of the data is maintained in the first encryption of the data (using the first cryptographic key). Furthermore, instead of the instruction, the functionally equivalent implementations $F_{(0,1)}(E_{K0}(T))$ through $F_{(n-1,n)}(E_{Kn-1}(T))$ are maintained in the program source code, where $$F_{(i,i+1)}(E_{Ki}(T))=\text{EVAL}_{Ki+1}(F,E_{Ki}(T),E_K(Y))$$

applies, and $i=0, \ldots, n-1$.

As a result of the implementation, due to the properties of the functionality EVAL the instruction is carried out on the encrypted data, and the encryption of the data is changed. In the process, decryption does not take place. The implementations and the encryption states result in a linearly directed graph having the encryption states as nodes and the functionally equivalent implementations as edges.

To achieve a higher degree of program code obfuscation, the implementations may also be realized in such a way that a complex directed acyclic (multi)graph results from the encryption transitions $E_{Ki}(T)/E_{Kj}(T)$. However, the graph must then be formed in such a way that the longest path, starting from the initialization state, has a length that corresponds to the number of desired executions without authorization.

In addition, information concerning, for example, the encryption status of the data is maintained in the program sequence, with the aid of which the access to a suitable implementation of the instruction is managed by an appropriate program logic system.

Instead of the instruction to be authorized, when the application in the program sequence is accessed, for example starting with the implementation corresponding to the first cryptographic key as a key for the input state, the implementation which is compatible with the instantaneous encryption state of the data and functionally equivalent to the authorizing instruction is executed.

A suitable challenge response protocol having the independent authorization component is executed in parallel with the program sequence. In the challenge response method, the data are encrypted (in instantaneous encryption, for example) and sent to the authorization component, which returns authorized data which allow the data to be written into the initial encryption state. For example, the authorization component may have the encryption algorithm E, the associated decryption algorithm $E^{-1}$, and the corresponding cryptographic key. The authorization component is thus able to decrypt the data, to encrypt the obtained plaintext using the first cryptographic key, and to return, for example, the data encrypted using the first cryptographic key as authorized information or a component thereof.

If during execution of the challenge response method the instruction is in the idle state for a period of time in the program sequence, i.e., the application, as a competing thread for the challenge response method, does not access an implementation of the instruction, or the data and/or the state is/are not changed, and authorized data are received from the authorization component (with the aid of the challenge response protocol), the instantaneous encryption state is converted into the first encryption state. In this case, the authorization of the program has taken place asynchronously with respect to the access to the instruction. In particular, the implementation, which is able to accept the data encrypted using the first cryptographic key, once again has the data, in the corresponding output state, which are necessary for its application, and is called up once again the next time the software application accesses the instruction.

On the other hand, if the instantaneous encryption state cannot be converted into the first encryption state because the application has in the interim accessed the instruction or an implementation, the data transmitted by the authorization component are discarded, and instead, the appropriate implementation is executed during the interim access.

If the application accesses the instruction or its implementations continuously in the program sequence so that the last encryption state in the graph, i.e., the mandatory authorization state, is reached, the instruction is not available again to the application until the above-described authorization process has been able to successfully terminate, i.e., the encryption state has once again been able to convert into another encryption state, in particular the first encryption state. In this scenario, if the total number of continuous accesses is greater than the value of parameter n, which indicates the maximum number of times the instruction is freely available for unauthorized execution, the continuous access by the application to the implementations of the instruction is interrupted until an authorization is obtained. However, it should be noted that in the development state of the application, the parameter n may often be selected in such a way that such access behavior of the application is avoided or occurs only with low probability, so that practically no interruption is necessary.

It is noted that in this method, an attacker cannot reset the encryption status, since he has neither the cryptographic key nor an implementation which converts the data into a state which is encrypted using an earlier cryptographic key in the series of cryptographic keys. In addition, as a result of this cryptographic safeguard an attacker is not able to generate further implementations of the instruction.

Furthermore, it is clear that the acceptance of a read/write instruction is advantageous for the security aspect of the method, since in this case the particular instantaneous content of the data is linked to the particular instantaneous cryptographic key in the program sequence, and thus, also linked to the appropriate functionally equivalent implementation of the instruction to be authorized. However, even if the method is used for instructions which do not meet the "read/write" condition, it is still suitable as an obfuscation method which conceals the authorization process.

The object is further achieved by a computer program product having at least one program sequence that is protected by an authorization method according to one or more embodiments of the invention. The advantages of the method become particularly apparent in such a computer program product. In this case, licensing or access protection, for example, may be achieved by the method.

The object is further achieved by a data carrier containing a computer program product according to one embodiment of the invention. By use of such a data carrier, the computer program product may be operated or subdivided without further protection. Trial periods are also conceivable. A (further) use or a (further) access may be controlled by the method.

The object is further achieved by a data processing unit or a system composed of multiple data processing units configured for carrying out the method according to one or more embodiments of the invention. A given software product or portions thereof installed on a data processing unit may thus be protected. In addition, a data processing unit per se may be protected, or its use may be controlled via the method. The system may have one or more data processing units which are used solely as an authorization component, in particular based on the steps according to the invention. In this case, appropriate communication means must be provided.

Selected advantageous features and embodiments are explained strictly by way of example with reference to the following description. The description is supported by the strictly schematic drawings, which show the following:

BRIEF DESCRIPTION OF THE DRAWINGS

The present invention is further illustrated by the following examples and figures, without being restricted thereto.

DETAILED DESCRIPTION OF THE INVENTION

Figure 1:
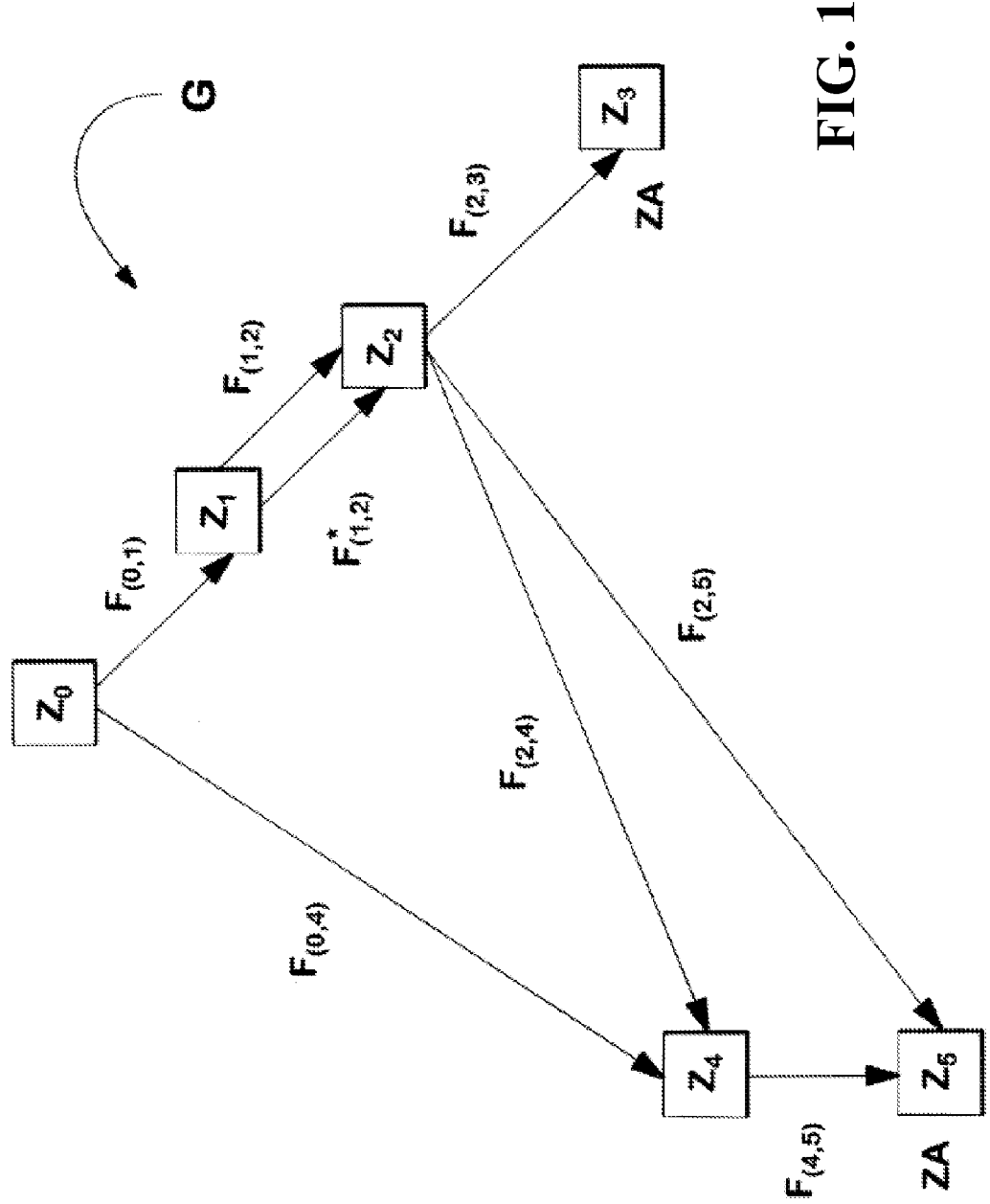
FIG. 1 shows an illustration of a graph having provided states and implementations.

FIG. 1 shows a multigraph G, in which the states $Z_0$ through $Z_5$ and implementations $F_{(i,j)}$ are apparent. The states $Z_0$ through $Z_5$ represent nodes of the graph G. The implementations $F_{(i,j)}$ represent the edges of the graph G.

It is apparent that the indices (i,j) of the implementations $F_{(i,j)}$ always match the input and output states which they adjoin. Thus, implementation $F_{(0,1)}$ leads from state $Z_0$ to state $Z_1$. State $Z_0$ is the input state, and state $Z_1$ is the output state of the implementation $F_{(0,1)}$.

It is apparent that the multigraph G is a directed acyclic (multi)graph. The multigraph G has two branches, one formed from states $Z_0$, $Z_4$, and $Z_5$, and the other formed from states $Z_0$, $Z_1$, $Z_2$, and $Z_3$. States $Z_3$ and $Z_5$ each represent sinks in the graph G, and thus form mandatory authorization states ZA. It is also apparent that there are implementations $F_{(2,4)}$ and $F_{(2,5)}$ which lead from one branch to the other. It is also apparent that a multiple edge exists between states $Z_1$ and $Z_2$ which is formed by the implementations $F_{(1,2)}$ and $F^*_{(1,2)}$. In this case, multiple implementations are connected between the input state and output state $Z_1$ and $Z_2$, respectively. No further edges lead out from the mandatory authorization states ZA ($Z_3$ and $Z_5$). Thus, no implementations exist which are able to accept $Z_3$ or $Z_5$ as an input state. Therefore, no use of the instruction F is possible from these states, unless the mandatory authorization states ZA ($Z_3$ and $Z_5$) are converted into other states which do not represent sinks.

Figure 2:
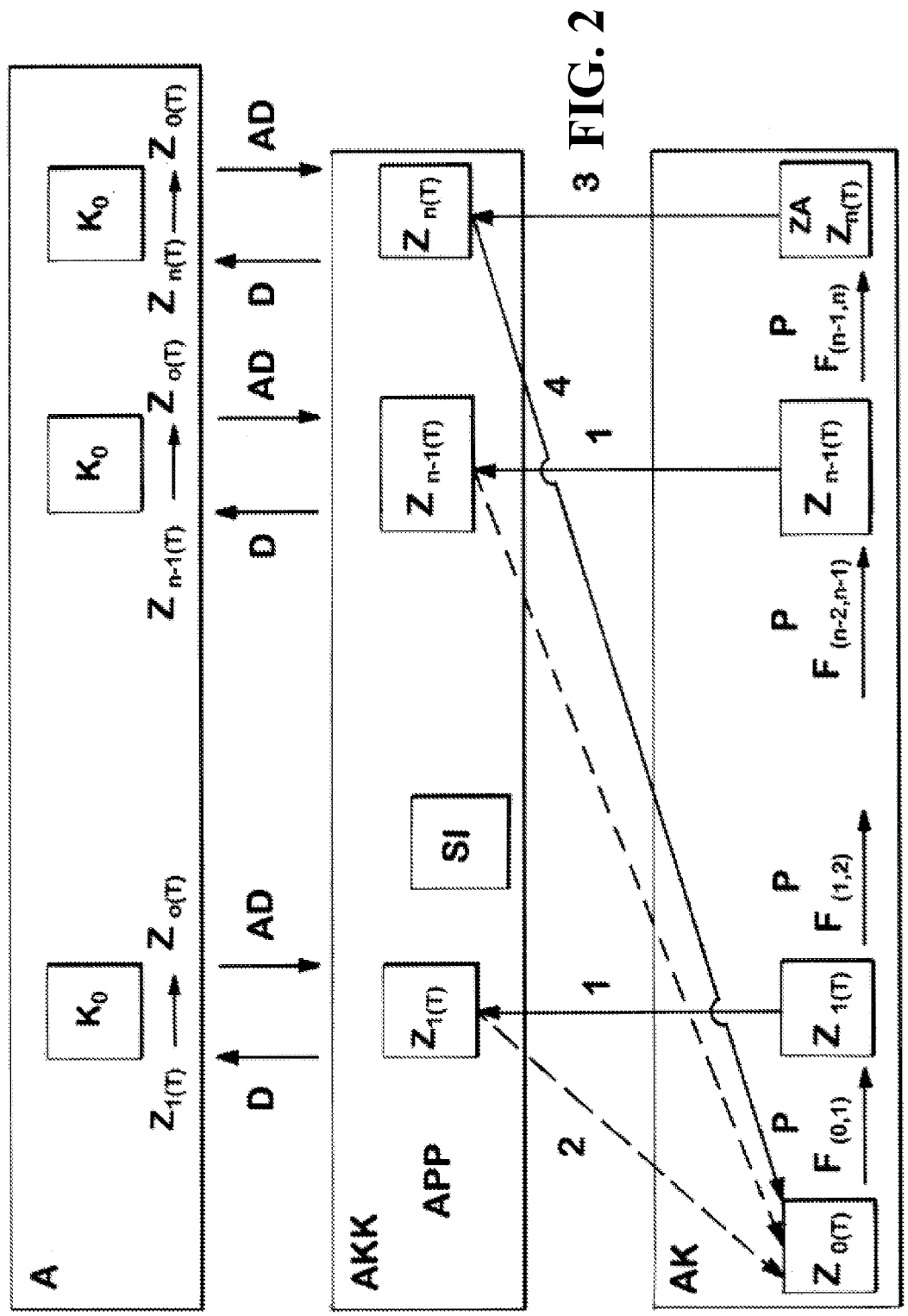
FIG. 2 shows an illustration of a sequence of the method according to the invention.

FIG. 2 shows an overview of one possible process sequence according to the invention, based on the method described above as a general example. Three components are apparent: an operating component AK which contains a program sequence P to be authorized, and implementations $F_{(i,j)}$ of an instruction F; an authorization coordination component AKK which contains the authorization program sequence paths APP; and an authorization component A.

Data T are maintained in states $Z_i(T)$ within the operating component AK. The states have a state index i=0, ... n, where n≥1. The implementations $F_{(i,j)}$ convert the states $Z_i$ of the data T, or the data T, from an input state $Z_i$ into a different output state $Z_j$. In this process, the state is changed upon each execution of an implementation $F_{(i,j)}$. This may occur until a mandatory authorization state ZA is reached, which in the present example is the case in state $Z_n(T)$. The states $Z_0$ through $Z_n$ and the implementations $F_{(i,j)}$ form a linear graph in the present example.

The authorization coordination component AKK is executed in parallel with the operating component. The authorization program sequence paths APP of the authorization coordination component accept the states $Z_i$ from the operating component at regular intervals for a start of an authorization attempt 1, and generate transfer data D and transmit same to the authorization component. For example, this involves a state $Z_i(T)$ as well as information concerning the cryptographic key $K_i$ appropriate for state $Z_i$, which are stored as status information SI. The transfer data D are transferred to the authorization component A. For example, re-encryption which converts the state $Z_i(T)$ into the initial state $Z_0(T)$ takes place in the authorization component A. For this purpose, in the present example the authorization component uses, among other things, the cryptographic key $K_0$, which it contains or which it may generate. After successful re-encryption, the new state of the data as well as information concerning the cryptographic key $K_0$ which is appropriate for this state, for example, are transmitted as authorized information AD to the authorization coordination component AKK by the authorization component A. The authorization coordination component then checks, for example, whether the state which it originally accepted is still present in the operating component AK, or whether the state in the operating component AK has in the meantime become another state. If the state is no longer the same, the authorization process fails, as illustrated by a dashed line arrow 2 in FIG. 2. Thus, a conversion of the state and a change in the status information SI in the operating component AK based on the authorized information AD do not take place. Instead, a change in state $Z_i(T)$ and in the status information SI has occurred due to the use of one of the functionally equivalent implementations $F_{(i,j)}$ of the instruction F to be authorized. In the example shown in FIG. 2, such a failed authorization process takes place n−1 times. Lastly, in operating component AK the possibility for executing the instruction F in the mandatory authorization state ZA, state $Z_n(T)$, ends.

Another correct interpretation of the dashed line arrows 2 is that of a successful authorization process before reaching the mandatory authorization state ZA, after implementations $F_{(i,j)}$ of the instruction F have been re-applied until the mandatory authorization state ZA, state $Z_n(T)$, is ultimately reached.

When the mandatory authorization state ZA, state $Z_n(T)$, is reached, an authorization program sequence path is executed and a mandatory authorization process 3 is started. The authorization coordination component AKK accepts the state $Z_n(T)$, for example, and transmits it, together with the status information SI concerning the appropriate cryptographic key $K_n$, as transfer data D to the authorization component A. The authorization component, with the assistance of the cryptographic key $K_n$ and the cryptographic key $K_0$, for example, re-encrypts state $Z_n(T)$ into state $Z_0(T)$, and transmits this state $Z_0(T)$ as well as the information concerning the appropriate cryptographic key, but without the actual key $K_0$ as authorized information AD, to the authorization coordination component AKK. The authorization coordination component carries out the mandatory authorization process to completion, as indicated by arrow 4 in FIG. 2. State $Z_n(T)$ is thus converted into state $Z_0(T)$ in operating component AK. The authorization coordination component AKK notes, as status information SI, that the valid key at that moment is the cryptographic key $K_0$.

The operating component AK is then able to re-execute the instruction F or an appropriate functionally equivalent implementation of the instruction F to be authorized.

Figure 3:
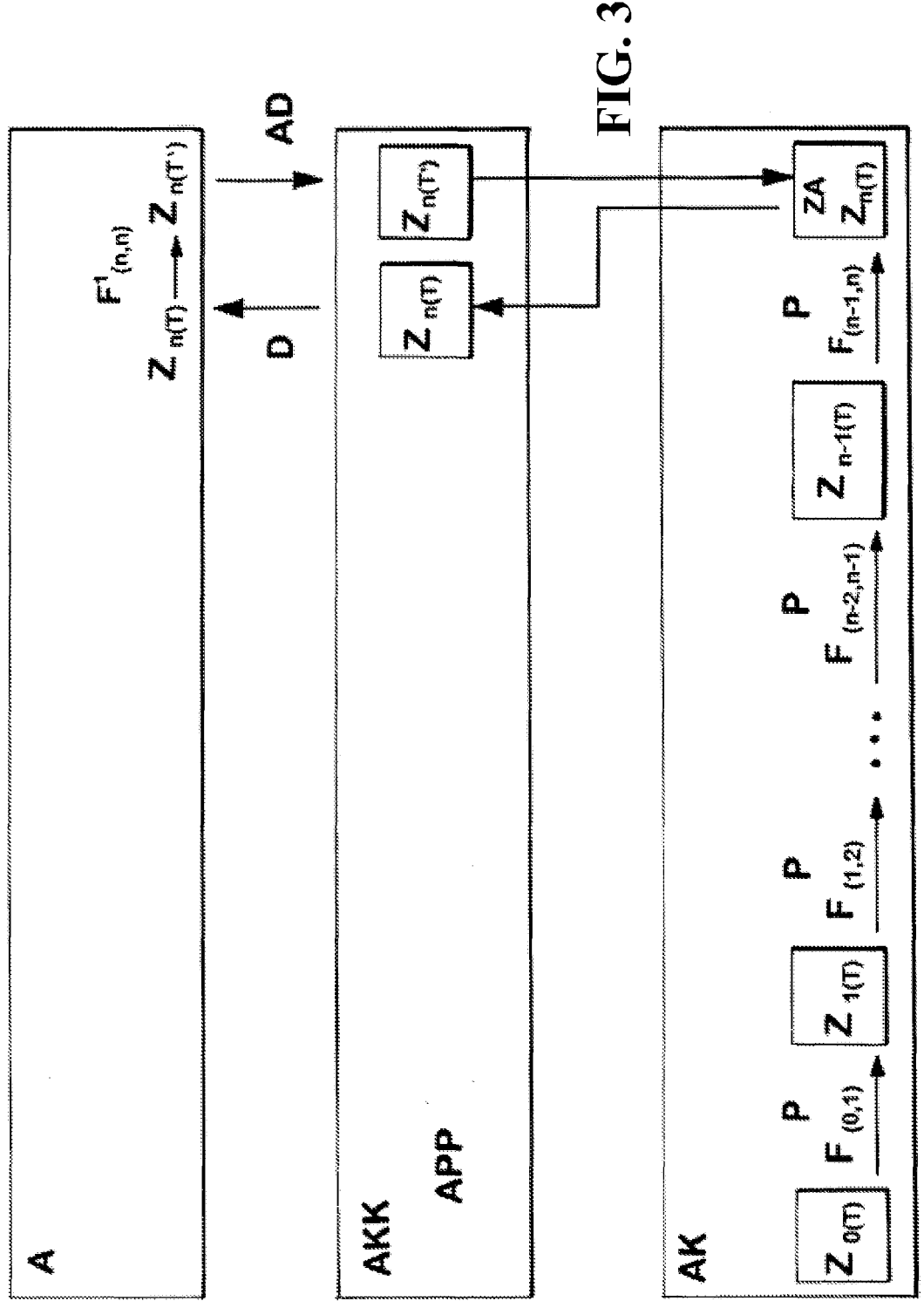
FIG. 3 shows an overview of a further possible implementation of the process sequence.

FIG. 3 shows another implementation of the method according to the invention, in which a synchronous authorization is combined with a predefined behavior of the application. The execution of the functionality of the instruction is partially displaced into the authorization component A. This may be selected, for example, when initially a certain number of executions of the instruction without authorization is allowed, and a synchronous authorization is to be subsequently provided.

Three components are once again apparent: operating component AK, authorization coordination component AKK, and authorization component A. In principle, the operating component AK and the authorization coordination component AKK may always be combined. Here as well, the program sequence P is once again part of the operating component AK. The program sequence P contains the implementations $F_{(i,j)}$. The authorization coordination component AKK, whose function may optionally also be realized in the operating component AK, contains exactly one authorization program sequence path APP. It is apparent that no authorization is attempted before the mandatory authorization state ZA, $Z_n(T)$, is reached. The authorization program sequence path initiates a mandatory authorization process 3 only after reaching the mandatory authorization state ZA. At this point the authorization coordination component AKK accepts the mandatory authorization state ZA, $Z_n(T)$, and transmits it as transfer data to the authorization component A. The authorization component A then executes an implementation $F_{(n,n)}$ of an instruction F' whose functionality corresponds to that of instruction F. The mandatory authorization state ZA, $Z_n(T)$, is thus converted into the mandatory authorization state ZA, $Z_n(T')$. However, the corresponding instruction F' is executed by the authorization component A, and the data T transferred as transfer data D are thus changed by the authorization component A. The authorization component transmits these changed data T' in state $Z_n$ as authorized information AD to the authorization coordination component AKK, which transmits these data to the operating component AK, so that a mandatory authorization state ZA is once again present at that location. Such a method may be combined with the method illustrated in FIG. 2.

The disclosure of European Patent Application No. 12 158 009.6 filed Mar. 5, 2012 is relied on and incorporated herein by reference.

List of Reference Symbols
P Program sequence
F Instruction
F' Corresponding instruction
$F_{(i,j)}$ Implementation
D Transfer data
T Data
$Z_n$ Provided states
AD Authorized information
APP Authorization program sequence path
A Authorization component
AKK Authorization coordination component
AK Operating component
$K_i$ Cryptographic key
SI Status information
ZA Mandatory authorization state
1 Start of an authorization attempt
2 Failed authorization process
3 Start of a mandatory authorization process
4 End of a successful mandatory authorization process

The invention claimed is:

1. A computer-implemented method for authorizing a program sequence (P) in particular of a computer program or a portion of a computer program comprising:
   a. using a computer processor to maintain data (T) of the program sequence (P) in various provided states $(Z_0, \ldots, Z_n)$ having state indices $(0, \ldots n,$ where $n \geq 1)$;
   b. using a computer processor to maintain at least one instruction (F) of the program sequence (P) which accesses the data (T) in functionally equivalent implementations $(F_{(i,j)})$, the index (i,j) passing through a non-empty finite multiset (M) ($|M| \geq 1$) over the Cartesian product of the set of the state indices with itself $(\{0, \ldots, n\} \times \{0, \ldots, n\})$ wherein each implementation $(F_{(i,j)})$ converts the data (T) from an input state $(Z_i)$ into an output state $(Z_j)$;
   c. using a computer processor to transfer transfer data (D) within at least one authorization program sequence path (APP) of the program sequence (P) to an authorization component (A) which returns authorized information (AD) only when predefined conditions are present;
   d. using a computer processor, the authorized information (AD) changes the state of the data (T) into another of the provided states $(Z_0, \ldots, Z_n)$ or changes the data (T) when the data (T) and/or the state of the data is unchanged since the transfer data (D) has been transferred;
   e. forming a directed acyclic multigraph (G) using a computer processor by the set of the state indices $(\{0, \ldots, n\})$ and the multiset (M), and the multigraph (G) has the provided states $(Z_0, \ldots, Z_n)$ as nodes and the implementations $(F_{(i,j)})$ as edges and/or multiple edges;
   f. using a computer processor to call up the instruction (F) in the program sequence (P) when at least one output edge in the graph (G) exists for the instantaneous state $(Z_i)$ and the computer processor executes an implementation $(F_{(i,j)})$ which corresponds to the at least one output edge;
   g. and wherein the computer processor uses the instruction (F) of the program sequence (P) in a mandatory authorization state (ZA) of the data (T) corresponding to a sink in the graph (G) only when
      I. the at least one authorization program sequence path (APP) is called up and the authorized information (AD) is returned from the authorization component (A), and
      II. after the at least one authorization program sequence path (APP) is executed, the data (T) is in one of the provided states $(Z_0, \ldots, Z_n)$, wherein the instantaneous state $(Z_i)$ does not represent a mandatory authorization state (ZA).

2. The method according to claim 1, wherein the data (T) in the states $(Z_0, \ldots, Z_n)$ and/or the implementations $(F_{(i,j)})$ are completely or partially present in obfuscated and/or encrypted form and wherein for each of the states $(Z_0, \ldots, Z_n)$, an independent cryptographic key $(K_i)$ $(K_i \neq K_j$ for $i \neq j)$ is selected which is suitable for the encryption algorithm used.

3. The method according to claim 2, further comprising using via the computer processor an encryption algorithm that is a component of Multi-Channel Finite Automata Code Transformation cryptographic scheme that allows operations on arguments which are encrypted using various, keys to be carried out without decrypting the arguments in question, and the implementations $(F_{(i,j)})$ and implementations of portions of the authorization program sequence path use this cryptographic scheme in whole or in part.

4. The method according to claim 1, wherein the instruction (F) has read/write access to the data (T), and using a computer processor each maintained implementation $(F_{(i,j)})$ correctly executes the instruction (F) only when applied to data (T) in the input state $(Z_i)$ of the output edge in the graph (G) associated with the implementation $(F_{(i,j)})$, and computer processor writes the data (T) in the output state $(Z_j)$, and each implementation $(F_{(i,j)})$, when applied to the data (T) in any other state than the associated input state ($Z_i$), transfers the program sequence (P) using a computer processor into an error state or an unsuitable state, and in particular, a direct change in the data (T) and/or direct changes in at least one of the implementations ($F_{(i,j)}$) causes computer processor to transfer the program sequence (P) into an error state or an unsuitable state, and/or result(s) in an exception state of the data (T) which is not a component of the provided states ($Z_0, \ldots, Z_n$).

5. The method according to claim 1, wherein the authorized information (AD) returned from the authorization component (A) is a function of the transfer data (D) and/or in a state ($Z_i$) allows the authorization program sequence path (APP) using a computer processor to convert the data (T) into one of the maintained states ($Z_0, \ldots, Z_n$), wherein a state (4) does not represent a mandatory authorization state (ZA) if the state ($Z_j$) of the data (T) after conversion has not changed since the transfer data (D) has been transferred to the authorization component (A), and wherein the maximum over the length of the paths from the state ($Z_j$) after the conversion to a mandatory authorization state (ZA) in the graph (G) is equal to or greater than the maximum over the length of the paths from the state ($Z_i$) before the conversion to a mandatory authorization state (ZA).

6. The method according to claim 1, wherein the transfer data (D) contains the data (T) and the authorized information (AD) contains a result of an instruction (F') for the transferred data (T) whose functionality corresponds to the instruction (F).

7. The method according to claim 1, wherein the transfer data (D) transferred to the authorization component (A) are obfuscated and/or encrypted by an additional encryption algorithm that is different from the encryption algorithm used for encryption of the states ($Z_i$), and/or the authorization component returns the authorized information (AD) in obfuscated and/or encrypted form by an additional encryption algorithm that is different from the encryption algorithm used for encryption of the states ($Z_i$).

8. The method according to claim 1, wherein a computer processor carries out the method through division into at least three components including an operating component (AK), an authorization coordination component (AKK), and the authorization component (A), wherein the data (T) of the program sequence (P), the implementations ($F_{(i,j)}$) which are functionally equivalent to the instruction (F), and the program sequence (P) are components of the operating component (AK), and wherein the transfer of the transfer data (D) to the authorization component (A), the receipt of the authorized information (AD) returned by the authorization component, and wherein the conversion into one of the maintained states ($Z_0, \ldots, Z_n$), is carried out by the authorization coordination component (AKK) within the scope of the authorization program sequence path (APP).

9. The method according to claim 8, wherein the authorization coordination component (AKK) is executed using a computer processor in parallel with the operating component (AK), and wherein the authorization coordination component (AKK) is an independent thread or part of an independent computer program running in parallel with the operating component (AK).

10. The method according to claim 1, wherein a status information item (SI) concerning the instantaneous state ($Z_i$) of the data (T) and/or the various compatible implementations ($F_{(i,j)}$) is maintained.

11. The method according to claim 1, further comprising determining at least one maintained implementation ($F_{(i,j)}$) and/or at least one key ($K_i$) with a computer processor according to a rule from at least one previously executed implementation or at least one previously used key and/or all of a portion of the provided states ($Z_0, \ldots, Z_n$) and/or further data that are relevant for the program sequence (P).

12. The method according to claim 1, wherein the authorization component (A) is situated or carried out spatially separate from the carrying out of the steps which are not performed by the authorization component, and wherein, the transfer data (D) transmitted to the authorization component and the authorized information (AD) are transmitted via a data transmission wide area network.

13. The method according to claim 1, wherein the computer program has at least one program sequence which is protected by the authorization component.

14. The method according to claim 1, wherein the computer program is part of a data carrier.

15. The method according to claim 1, further comprising carrying out said method by a data processing unit or system of data processing units.

* * * * *